United States Patent
Krusell et al.

(10) Patent No.: US 10,885,088 B2
(45) Date of Patent: *Jan. 5, 2021

(54) SYSTEMS AND METHODS FOR IDENTIFYING ISSUES IN ELECTRONIC DOCUMENTS

(71) Applicant: TSG Technologies, LLC, St. Louis, MO (US)

(72) Inventors: Noah Krusell, Chesterfield, MO (US); Anthony L. Hinrichs, St. Louis, MO (US); Nathan D. Dees, Creve Coeur, MO (US); Caimei Lu, Kirkwood, MO (US)

(73) Assignee: TSG Technologies, LLC, St. Louis, MO (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/392,824

(22) Filed: Apr. 24, 2019

(65) Prior Publication Data
US 2019/0251108 A1    Aug. 15, 2019

Related U.S. Application Data

(63) Continuation of application No. 15/629,321, filed on Jun. 21, 2017, now Pat. No. 10,303,710, which is a (Continued)

(51) Int. Cl.
*G06F 16/35* (2019.01)
*G06Q 10/10* (2012.01)

(52) U.S. Cl.
CPC ............. *G06F 16/35* (2019.01); *G06Q 10/10* (2013.01)

(58) Field of Classification Search
CPC ................................ G06F 16/35; G06Q 10/10
See application file for complete search history.

(56) References Cited

U.S. PATENT DOCUMENTS

| 9,002,848 | B1 | 4/2015 | Peng et al. |
| 9,710,550 | B2 | 7/2017 | Krusell et al. |

(Continued)

OTHER PUBLICATIONS

Ramsay, J. O. et al. "Spline smoothing with model-based penalties" Behavior Research Methods, Instruments & Computers 1997, 29 (1), pp. 99-106, 8 pages.

(Continued)

*Primary Examiner* — Ashish Thomas
*Assistant Examiner* — Dustin D Eyers
(74) *Attorney, Agent, or Firm* — Polsinelli PC

(57) ABSTRACT

A computer system identifies and prioritizes issues in electronic documents from electronic social media sources and/or from traditional media sources. The computer system includes a communication network linked to one or more of the sources and a computer server in communication with the communication network. The computer server is configured to receive electronic documents from the sources via the communication network. The computer server has memory and a processor, the memory including processor executable instructions stored in the memory and executable by the processor. The instructions comprise data collection instructions, topic modeling instructions including instructions for weighing and instructions for indicating a distribution for identified issues within each of the retrieved documents, issue assignment instructions, instructions for determining, and instructions for ranking.

21 Claims, 5 Drawing Sheets

Related U.S. Application Data continuation of application No. 14/476,889, filed on Sep. 4, 2014, now Pat. No. 9,710,550.

(60) Provisional application No. 61/873,932, filed on Sep. 5, 2013.

(56) References Cited

U.S. PATENT DOCUMENTS

| | | |
|---|---|---|
| 2009/0319342 A1 | 12/2009 | Shilman et al. |
| 2010/0280985 A1 | 11/2010 | Duchon et al. |
| 2011/0004606 A1 | 1/2011 | Aumann et al. |
| 2014/0297639 A1 | 10/2014 | Lee et al. |
| 2015/0066953 A1 | 3/2015 | Krusell et al. |

OTHER PUBLICATIONS

Non-Final Office Action for U.S. Appl. No. 14/476,889 dated Sep. 7, 2016, 25 pages.
Notice of Allowance for U.S. Appl. No. 14/476,889 dated May 2, 2017, 10 pages.
Non-Final Office Action for U.S. Appl. No. 15/629,321 dated Mar. 8, 2018, 41 pages.
Final Office Action for U.S. Appl. No. 15/629,321 dated Aug. 30, 2018, 23 pages.
Notice of Allowance for U.S. Appl. No. 15/629,321 dated Feb. 21, 2019, 10 pages.

| | A | B | C | D | E | F | G | H | I | J | K | L |
|---|---|---|---|---|---|---|---|---|---|---|---|---|
| 1 | Issue | Volume | Tone | Influencer | Speed | Emotion | Normalized_Volume | Normalized_Negative_Tone | Normalized_Influences | Normalized_Speed | Normalized_Emotion | % |
| 2 | Topic_246_Subtopic_1 | 12643 | 0.0104 | 0.6424 | 1 | 8.9666 | 9.4856 | 0.8162 | 0.4989 | 0.6233 | 0.2872 | 10.9655 |
| 3 | Topic_32_Suptopic_30 | 11828 | -0.0273 | 0.5572 | 1 | 2.3439 | 8.8394 | 1.0654 | 0.2051 | 0.6223 | 0.2606 | 9.7483 |
| 4 | Topic_156_Subtopic_2 | 33 | -0.0224 | 0.8383 | 5 | 18.7865 | -0.5038 | 1.0308 | 1.1735 | 2.5027 | 3.9740 | 8.5788 |
| 5 | Topic_156_Subtopic_6 | 9951 | 0.0596 | 0.8674 | 5 | 8.6308 | 7.3526 | 0.4951 | 0.2408 | -0.6223 | 0.6783 | 8.1440 |
| 6 | Topic_296_Subtopic_3 | 8 | -0.3033 | 0.8015 | 5 | 17.6072 | -0.3236 | 1.5590 | 0.3580 | 2.9027 | 3.6206 | 7.9163 |
| 7 | Topic_233_Subtopic_1 | 67 | -0.1778 | 0.5573 | 5 | 16.4422 | -0.4369 | 2.0409 | 0.2055 | 2.9227 | 3.2333 | 7.8856 |
| 8 | Topic_4_Subtopic_4 | 10180 | 0.1462 | 0.3414 | 1 | 6.4467 | 7.3340 | -0.0202 | 0.4412 | -0.6223 | 0.0241 | 7.6536 |
| 9 | Topic_104_Subtopic_1 | 11360 | 0.0644 | 0.0629 | 1 | 8.8335 | 8.4925 | 0.4642 | 4.4100 | .06223 | 0.7408 | 7.3768 |
| 10 | Topic_97_Subtopic_8 | 101 | -0.0928 | 0.3182 | 5 | 35.2013 | -0.4500 | 1.4868 | 0.2604 | 2.5027 | 2.1156 | 7.5288 |
| 11 | Topic_293_Subtopic_8 | 6608 | -0.0060 | 0.8753 | 1 | 9.5511 | 4.7045 | 0.9169 | 1.2948 | 0.6223 | 0.9769 | 2.2363 |
| 12 | Topic_240_Subtopic_5 | 108 | -0.0223 | 0.9229 | 3 | 11.5065 | -0.4444 | 1.5567 | 1.6383 | 2.9337 | 1.7090 | 7.1623 |
| 13 | Topic_69_Subtopic_8 | 13 | -0.0137 | 0.8232 | 5 | 14.7344 | -0.5197 | 0.9615 | 1.1223 | 2.9023 | 2.6321 | 7.1443 |
| 14 | Topic_152_Subtopic_6 | 40 | -0.0505 | 0.7545 | 4 | 17.1026 | -0.4983 | 1.2146 | 0.8854 | 2.0215 | 3.4278 | 7.0908 |
| 15 | Topic_134_Subtopic_3 | 22 | 0.0637 | 0.8467 | 3 | 20.6492 | -0.5125 | 0.4552 | 1.2034 | 2.1402 | 4.5796 | 6.8614 |
| 16 | Topic_62_Subtopic_2 | 3296 | -0.2035 | 0.7238 | 4 | 7.8276 | 2.8809 | 1.5605 | 0.7396 | 2.0213 | 0.4160 | 6.8584 |
| 17 | Topic_115_Subtopic_3 | 8314 | 0.1513 | 0.8358 | 1 | 7.0551 | 6.0559 | -0.1037 | 1.1588 | -0.6223 | 0.1669 | 6.6556 |
| 18 | Topic_186_Subtopic_9 | 30 | -0.1398 | 0.8224 | 5 | 3.5030 | -0.4743 | 2.0161 | 1.1194 | 2.9321 | 0.9613 | 6.3230 |
| 19 | Topic_100_Subtopic_9 | 8853 | -0.0657 | 0.3023 | 1 | 7.1353 | 6.3620 | 1.3136 | -1.0184 | -0.6223 | 0.2060 | 6.4469 |
| 20 | Topic_152_Subtopic_5 | 2662 | -0.1481 | 0.3831 | 1 | 6.7349 | 5.5394 | 1.8515 | -0.3962 | -0.6223 | 0.0590 | 6.4331 |
| 21 | Topic_6_Subtopic_1 | 8249 | -0.0858 | 0.1009 | 1 | 8.9675 | 6.0044 | 1.4450 | -1.3681 | -0.6223 | 0.7875 | 6.2465 |
| 22 | Topic_54_Subtopic_9 | 20 | -0.0357 | 0.6644 | 5 | 32.7823 | -0.5141 | 1.2480 | 0.5747 | 2.9022 | 2.0355 | 6.2368 |
| 23 | Topic_13_Subtopic_2 | 8410 | 0.0253 | 0.6350 | 1 | 6.1624 | 6.1819 | 0.3370 | 0.4388 | 0.6223 | -0.1228 | 6.2182 |
| 24 | Topic_170_Subtopic_6 | 120 | -0.0592 | 0.6351 | 1 | 12.1934 | -0.4349 | 1.2748 | 0.6115 | 2.9827 | 1.8344 | 6.1881 |
| 25 | Topic_129_Subtopic_8 | 37 | 0.0984 | 0.8578 | 3 | 18.8825 | -0.5007 | 0.2423 | 1.2416 | 1.1432 | 4.0085 | 6.1319 |
| 26 | Topic_226_Subtopic_5 | 2139 | 0.0072 | 0.6026 | 3 | 7.6364 | 3.1253 | 0.8376 | 0.3616 | 0.4223 | 0.3555 | 6.0636 |
| 27 | Topic_173_Subtopic_8 | 4121 | -0.1006 | 0.9113 | 1 | 9.5464 | 2.7344 | 1.5418 | 1.4350 | -0.6223 | 0.9760 | 6.0559 |
| 28 | Topic_227_Subtopic_8 | 58 | 0.0816 | 0.9047 | 3 | 17.6569 | -0.4840 | 0.3518 | 1.4034 | 1.1462 | 3.6075 | 6.0189 |
| 29 | Topic_67_Subtopic_5 | 196 | 0.0316 | 0.9927 | 4 | 12.5169 | -0.3241 | 0.6784 | 1.7067 | 2.0215 | 1.9589 | 5.9907 |
| 30 | Topic_294_Subtopic_1 | 6471 | 0.0080 | 0.7373 | 1 | 7.5069 | 4.5959 | 0.8322 | 0.8294 | 0.6223 | 0.3535 | 5.9488 |
| 31 | Topic_148_Subtopic_1 | 7063 | 0.0661 | 0.4982 | 1 | 9.9579 | 5.0649 | 0.4538 | 0.0019 | -0.6223 | 0.9791 | 5.8764 |
| 32 | Topic_48_Subtopic_8 | 23 | 0.0332 | 0.3301 | 1 | 21.9123 | -0.5118 | 0.6681 | -0.5779 | 1.1402 | 4.9886 | 5.7073 |
| 33 | Topic_340_Subtopic_6 | 30 | 0.1209 | 0.8553 | 4 | 15.2427 | -0.5062 | 0.0948 | 1.2328 | 2.0215 | 2.8240 | 5.6669 |

FIG. 4

SYSTEMS AND METHODS FOR IDENTIFYING ISSUES IN ELECTRONIC DOCUMENTS

CROSS-REFERENCE TO RELATED APPLICATION

This application is a continuation of U.S. patent application Ser. No. 15/629,321, entitled "Systems and Methods for Identifying Issues in Electronic Documents," filed on Jun. 21, 2017, which is a continuation of U.S. patent application Ser. No. 14/476,889 filed Sep. 4, 2014, entitled "Systems and Methods for Identifying Issues in Electronic Documents," which claims priority under 35 U.S.C. § 119 to U.S. Patent Application No. 61/873,932, filed Sep. 5, 2013, entitled "Systems and Methods for Identifying Issues in Electronic Documents," the entire contents of which are incorporated herein by reference.

BACKGROUND

This section provides background information related to the present disclosure which is not necessarily prior art.

The present disclosure relates to systems and methods for evaluating electronic documents to identify and prioritize issues indicated by the text of the documents.

Collections of "big data" are becoming commonplace in modern industry. However, these large stores of data are useless without the employment of effective techniques for uncovering meaningful, actionable insights out of the multitude of available information. Most recently, analysis trends in business data science center on predictive analysis, allowing data owners to get ahead of the issues that may affect their business.

As trends intensify and issues become more volatile, the time that managers have to react to these issues diminishes, and their available options dwindle quickly. There is a need for systems and methods which address this problem for managers by providing an early warning of trending issues to maximize managerial control while limiting losses and missed opportunities.

If the process of sifting through mountains of data to select and prioritize issues for each report was done solely by hand, it would 1) take an inordinate amount of time, 2) have a high potential for error, and 3) undoubtedly introduce some measure of subjectivity. As these drawbacks are quite significant, there is a need for a solution which will automatically perform the task of issue discovery and prioritization in a consistent, repeatable fashion with very little human intervention.

SUMMARY

This section provides a general summary of the disclosure, and is not a comprehensive disclosure of its full scope or all of its features.

In one form, a computer system identifies and prioritizes issues in electronic documents from electronic social media sources and/or from traditional media sources. The computer system includes a communication network linked to one or more of the sources and a computer server in communication with the communication network. The computer server is configured to receive electronic documents from the sources via the communication network. The computer server has memory and a processor, the memory including processor executable instructions stored in the memory and executable by the processor. The instructions comprise:

data collection instructions for retrieving and scoring documents from the sources via the network;

topic modeling instructions for identifying one or more issues in each of the retrieved documents according to terms in the retrieved documents including:

instructions for weighing each term in each of the retrieved documents with regard to its relevance to each identified issue; and instructions for indicating a distribution for identified issues within each of the retrieved documents;

issue assignment instructions for formally associating a limited list of specific issues with each retrieved document;

instructions for determining summary metrics for each identified issue; and instructions for ranking the issues relative to each other based on weighted summary metrics.

In another form, a non-transitory computer readable storage medium for use with a computer system is described.

In another form, a computer executable storage method for identifying and prioritizing issues in electronic documents from electronic social media sources and/or from traditional media sources is described.

Further aspects and areas of applicability will become apparent from the description provided herein.

It should be understood that various aspects of this disclosure may be implemented individually or in combination with one or more other aspects.

It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 4 is a screen shot illustrating an example of an output display created in the system and method of FIG. 1.

Corresponding reference numerals indicate corresponding parts or features throughout the several views of the drawings.

DETAILED DESCRIPTION

Figure 1:
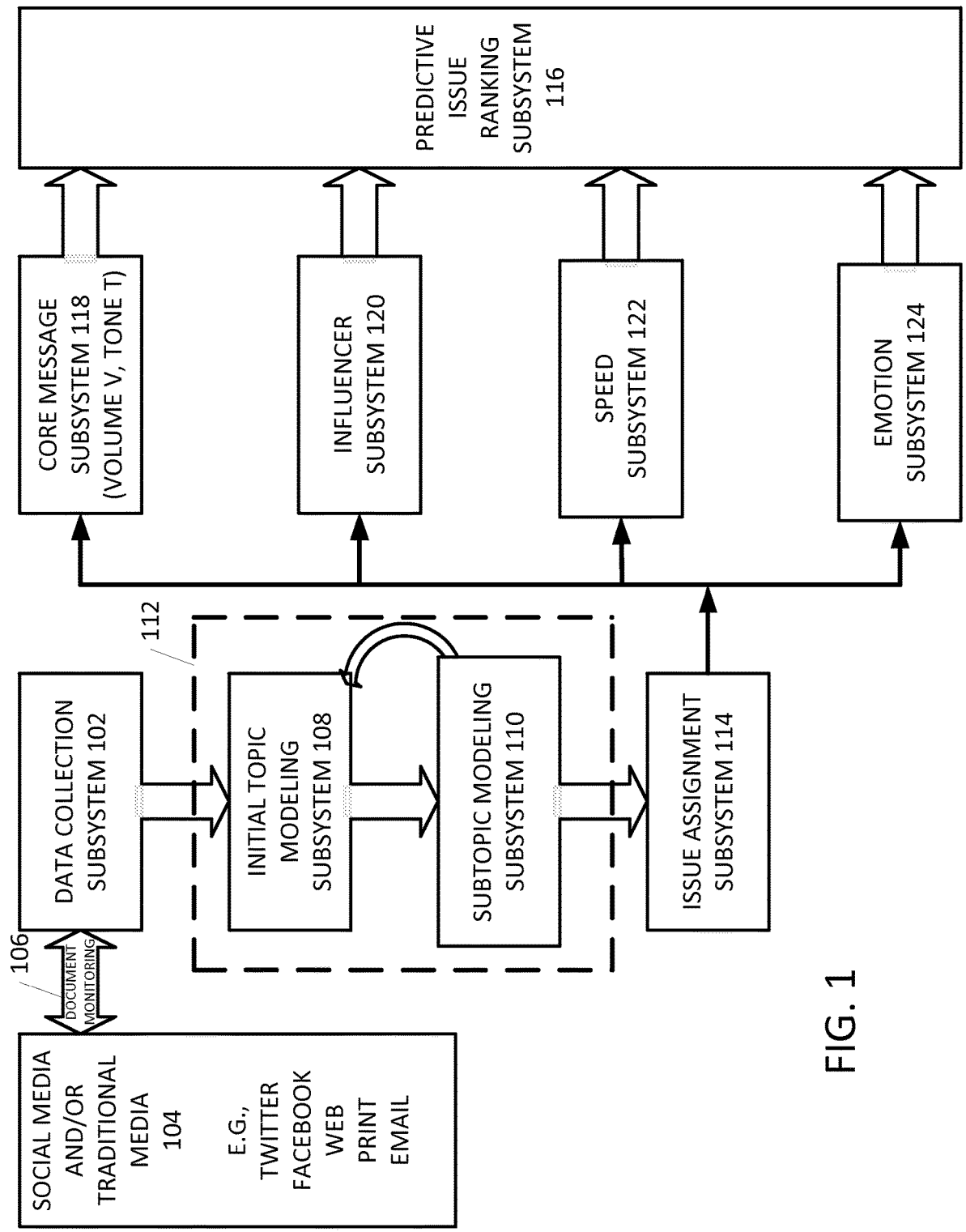
FIG. 1 is a block diagram illustrating a system and method for identifying issues in electronic documents from electronic social media sources and/or from traditional media sources according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

DETAILED DESCRIPTION

Figure 2:
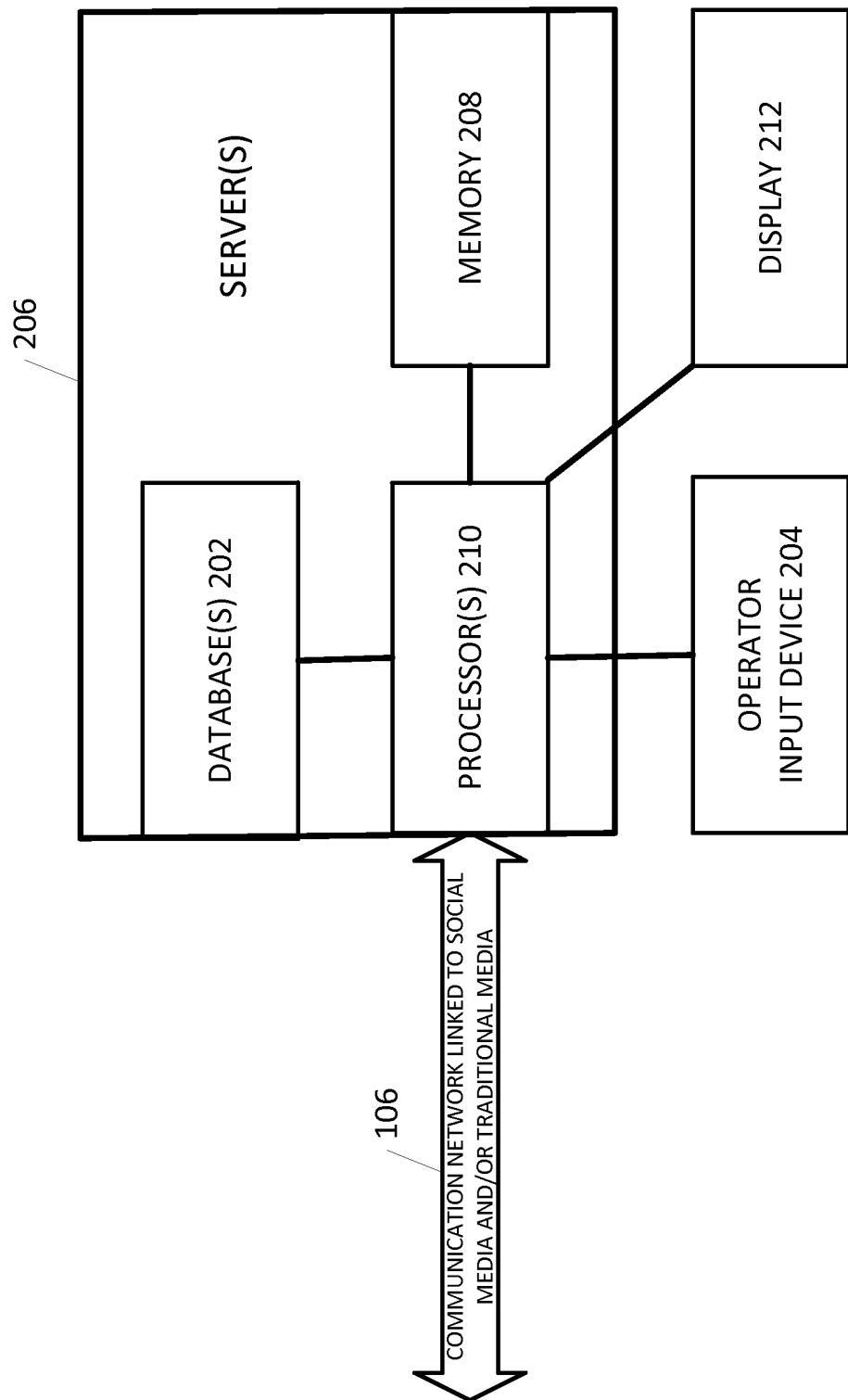
FIG. 2 is a block diagram illustrating a system hardware configuration for the system of FIG. 1 according to one example embodiment of the present disclosure.
Figure 3:
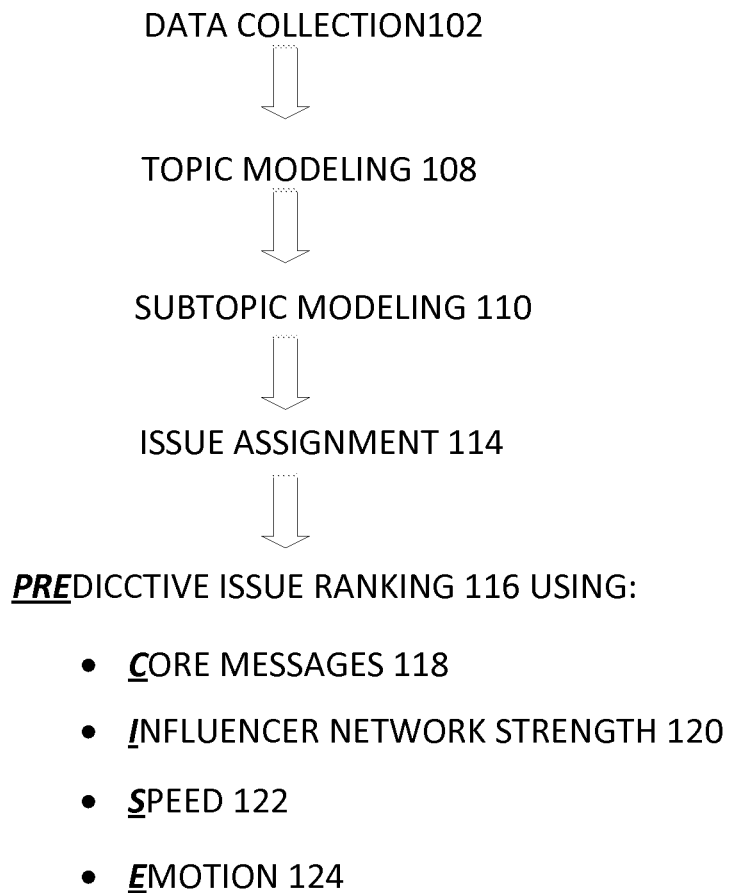
FIG. 3 is a flow diagram illustrating a method for identifying issues in electronic documents from electronic social media sources and/or from traditional media sources for the method of FIG. 1 according to one example embodiment of the present disclosure.

The systems and methods described herein comprise a processor-implemented multi-step analysis designed to start with millions of social and traditional media observations, and arrive at the highest-priority strategic actionable insights in a repeatable, automated fashion. As an overview, FIG. 1 presents a block diagram, FIG. 2 illustrates a hardware configuration, FIG. 3 lists the steps of the method, and FIG. 4 is an example of an output display, each of which are described in greater detail below.

Data Collection 102

In one form, systems and methods of the disclosure include a data collection subsystem 102 of processor executable instructions to periodically (e.g., weekly) aggregate millions of observations in data in social and traditional media 104 related to the business interests of current and potential clients (i.e., entities) via a communications network of one or more document monitoring portals 106. In order to achieve the objective of offering strategic advice for business decision-making, systems and methods of the disclosure cull and prioritize the full range of issues discussed in these observations, and then synthesize the core messages, current sentiments, and emotional intensities of these issues to form concise, informative business reports. Moreover, systems and methods of the disclosure use cues within the data to make predictions about upcoming and developing issues, and use recurring research updates to show issue landscape changes and trends.

The input to the systems and methods described herein is any sizeable collection of text documents including by not limited to social and/or traditional media 104. This collection typically consists of documents from various media sources, potentially including Twitter, Facebook, web, news, print, and TV/radio, all targeted toward specific entities, brands, or issues of interest. As noted herein, each document, upon retrieval, is annotated automatically using natural language processing systems to identify document "sentiment" (or "tone"), document emotion (a single-valued score), and a list of entities mentioned within the document. These annotations, along with the full text of each article, are stored in databases 202 (FIG. 2), and are available for each of the following steps in the processor-implemented analysis of the systems and methods described herein.

Topic Modeling 108

The next step after data collection by subsystem 102 in the systems and methods described herein is to classify by an initial topic modeling subsystem 108 of processor executable instructions the multitude of text documents into binned topics of discussion, or issues. There are a variety of textual classification techniques which can be used for identifying topics within social media data, such as Naïve Bayesian, Support Vector Machines, Decision Tree, Logistic Regression, etc. Each of these techniques requires a large amount of training data, namely social media documents which have already been manually assigned, document-by-document, to pre-defined topics. Such training data unfortunately takes much effort to develop, and also does not support the immediate discovery of emerging topics within the data. In one form, the systems and methods described herein automatically identify all topics, including new, emerging topics in a quick and efficient manner using any collection of documents a user provides so that training data is minimized or not required.

For example, the systems and methods described herein apply text analytics technology called Topic Modeling (TM) to discover the topical structures of social media documents and classifying those documents into different topical categories. TM has several advantages over traditional classification techniques. First, no manually-classified training data is needed. Second, TM is adaptive to topical change. These advantages can be achieved because TM learns the topical categories from a set of documents directly; no knowledge (or limited knowledge) about the topical categories is required in advance. Third, in TM, unlike in other techniques, a document can be assigned to multiple topical categories.

Given the collection of input documents, the TM analysis in systems and methods described herein generates two iteratively-evolved outputs, a topic-term probability matrix, and document-topic probability matrix. The probabilities in the topic-term probability matrix serve to weight each term (word in a document) with regard to its relevance to each topic; the higher the probability for a topic-term pair, the more likely the term is to be chosen by an author writing about the given topic. The document-topic probability matrix shows the topical distribution within each document. In this matrix, the prominence of a topic within the discussion of a document is represented with a probability ranging from 0 to 1; higher document-topic probabilities indicate increased relevancy of the specific topic within the particular document. In summary, through TM, all of the topics discussed in a given collection of social media documents are identified, as well as the relevancy of each topic within each document. Thus, the topic modeling subsystem 108 includes instructions for weighing each term in each of the retrieved documents with regard to its relevance to each identified issue and instructions for determining a topic-term probability matrix. In addition, the topic modeling subsystem 108 includes instructions for indicating a distribution for identified issues within each of the retrieved documents including instructions for determining a document-topic probability matrix.

In systems and methods described herein, each topic discovered during the TM analytics represents a conversational issue within the targeted social media dataset stored in databases 202. Issues are given meaningful labels by an operator via an operator input device 204 by a person with domain knowledge related to the overall dataset using the semantics of the set of terms with the highest topic-term probabilities for the given topic. As such, contextually off-target topics and issues identified during the labeling analytics are discarded by an operator via the operator input device 204; additionally, highly-overlapping issues are combined as deemed necessary.

Subtopic Modeling 110

In some cases, an issue derived from the TM analytics may be too broad to be useful in the identification of concise core messages or actionable key insights. After such broad issues are identified by an operator via the operator input device 204 during the topic-labeling analytics, the text from the documents assigned to these issues is collected and re-run through the TM analysis systematically by a server, issue-by-issue, in order to achieve more granular divisions of topics within these issues. After the more granular "subtopics" are labeled by an operator via the operator input device 204, off-target subtopics are discarded as before, while contextually relevant subtopics are promoted as independent issues, and added to the complete list of issues discovered during the original TM analytics. As shown in FIG. 1, the topic modeling TM may be accomplished by an initial topic modeling subsystem 108 followed by a subtopic modeling subsystem 110 of processor executable instructions. Alternatively, the initial topic modeling and the subtopic modeling may be accomplished by a single topic modeling subsystem 108 and the subtopic modeling subsystem 110 as indicated by arrow 112 merely redirects broad topics to topic modeling subsystem 108 for further granular analysis.

Thus, in one form, the topic modeling subsystem TM includes the initial topic modeling subsystem 108 and the subtopic modeling subsystem 110 comprising processor executable instructions including initial topic modeling instructions for identifying one or more initial issues in the collection of the retrieved documents according to terms in the retrieved documents, and subtopic modeling instructions for identifying one or more issues in each of the initial issues of the retrieved documents according to terms in the retrieved documents for each initial issue.

Issue Assignment 114

As described above, the prominence of a topic within a document is defined by an issue assignment subsystem 114 of processor executable instructions using the probabilities in a document-topic probability matrix. The systems and methods described herein move forward by using these probabilities to formally "assign" a discrete number of the most highly-prominent topics represented in each document to the document itself in the following manner:

Given a document D, systems and methods described herein identify, in descending order, a limited number of top document-topic matrix probabilities (e.g., three probabilities: $p_1$, $p_2$, and $p_3$). Next, rules are used to assign topics (issues) to documents. For example, For i=1, 2, and 3,
i. If the overall probability (sum of $p_j$, j<i) for probabilities of issues assigned to this document is greater than or equal to 0.8, stop assigning issues to this document.
ii. If the probability $p_i$ is less than 0.1, stop assigning issues to this document.
iii. Assign the issue represented by $p_1$ to document D.

A document may thus be assigned to a maximum of issues (e.g., three in the example above). This analysis may result in some documents not being associated with any issue, for instance, if a document is paired with every issue in the document-topic matrix at a very low probability. Also, for any given issue, there is now an associated collection of documents. The individual issue probabilities, $p_i$, are no longer used.

Thus, in one form, the issue assignment subsystem 114 of processor executable instructions comprises issue assignment instructions for limiting the number of issues formally associated with each of the retrieved documents based on the values in the document-topic probability matrix.

Predictive Issue Ranking 116

The next step in the analytics is executing a predictive issue ranking subsystem 116 of processor executable instructions to rank-order the assigned issues identified in the Topic Modeling subsystem 108 and Subtopic Modeling subsystem 110 and assigned by the issue assignment subsystem 114. Top-ranked issues will be deemed to be the most significant issues in the current landscape of the business decision-making process.

Ranking is performed by combining several per-issue summary metrics into a single quantitative score for each issue. These per-issue quantitative scores may then be sorted numerically to determine the overall order of significance of the issues.

The predictive issue ranking subsystem 116 for calculating the summary metrics for each issue includes one or more of the following:
- A core message subsystem 118 of processor executable instructions to determine a volume (V), and a sentiment (or "tone", T) for each assigned issue;
- An influencer subsystem 120 of processor executable instructions to determine an influencer network strength (I);
- A speed subsystem 122 of processor executable instructions to determine a velocity (or "speed", S); and
- An emotion subsystem 124 of processor executable instructions to determine an overall emotional intensity (E).

The single quantitative ranking score, R, for each issue (i) is defined by the predictive issue ranking subsystem 116 using the summary metrics as $$R_i = \omega_V\left(\frac{V_i - \mu(V)}{\sigma(V)}\right) - \omega_T\left(\frac{T_i - \mu(T)}{\sigma(T)}\right) + \omega_I\left(\frac{I_i - \mu(I)}{\sigma(I)}\right) + \omega_S\left(\frac{S_i - \mu(S)}{\sigma(S)}\right) + \omega_E\left(\frac{E_i - \mu(E)}{\sigma(E)}\right)$$ (Equation 1)

Each summary metric is weighted using weights $\omega_V$, $\omega_T$, $\omega_I$, $\omega_S$, and $\omega_E$ for Volume, Tone, Influencer network strength, Speed, and overall Emotional intensity, respectively. Alternatively or in addition, each summary metric is scaled via the subtraction of its mean ($\mu$) across all of the issues and division by its standard deviation ($\sigma$) across all of the issues. The weights $\omega_V$, $\omega_T$, $\omega_I$, $\omega_S$, and $\omega_E$ may be preassigned or may be selected based upon an ongoing iterative analytics by an operator via the operator input device 204 of evaluating historical quantitative scores calculated for previously-discovered issues, and comparing them for accuracy to the actual lifecycles of the real-world issues they describe.

Thus, in one form, the predictive issue ranking subsystem 116 includes processor executable instructions for the determining summary metrics including:
- core message instructions for determining a Volume V and a Tone T for each issue based on the number of retrieved documents, and terms in the retrieved documents, respectively;
- influencer instructions for determining an Influencer network strength I for each issue based on the entities identified within the retrieved documents;
- speed instructions for determining a Speed S for each issue based on a timing of the terms in the retrieved documents; and
- emotion instructions for determining an Emotion E for each issue.

Core Messages 118

For each issue, the core message subsystem 118 identifies two core message components: volume and sentiment. The summary metric Volume, V, is the number of documents assigned to a given issue during the issue assignment analysis described above. The summary metric Sentiment (or tone, T) is the average of the per-document sentiment scores assigned during the data collection analysis to all of the documents representing a given issue i. In one form, a per-document sentiment has a value between −1 and +1, and is continuous between these limits. In one form, sentiment may be included in the single quantitative score, R, with a reversed sign (see Equation 1, above), to indicate that issues exhibiting negative sentiment are deemed more important than those exhibiting positive sentiment.

Influencer Network Strength 120

The influencer subsystem 120 assesses the influencer strength for each topic (issue) using results generated from the application of a global influencer network and an Entity-Topic Modeling (ETM) analysis. The goal of incorporating influencer strength into the PRECISE measurement is to promote topics which are highly associated with entities of high influence. This goal is based on list of the entities mentioned in each document which is extracted during the data collection analysis by the data collection subsystem 102.

The influencer strength of a topic is calculated in three steps. First, a global entity network is developed based on the co-occurring relationships of entities in collected documents. Within the network, the centrality of each entity is calculated as a measure of its influence. Secondly, the ETM is run to measure the topic-entity association. Finally, a final influencer strength score is calculated based on entity centrality and topic-entity association.

The centrality tells the relative prominence of an entity within a network based on how intensively it is involved in relationships with other entities. The centrality can be calculated using one of the centrality measures from graph theory and network analysis, such as degree centrality, closeness centrality, betweenness centrality, and eigenvector centrality.

ETM operates on the entire set of collected documents in a manner that is similar to or the same as that of the term-based (TM) analytics described above. The document-topic probability matrix created during the TM analytics may be used as an input. The goal of ETM, however, is to learn the relationships between the term-based topics discovered during the TM analytics and all of the entities (not terms) mentioned within these topics.

In one form, the TM's document-topic probability matrix is set as fixed in ETM, and not allowed to iteratively evolve. This technique of fixing the document-topic probability matrix ensures that the probabilistic connections between the articles which represent the overall topical structure discovered during TM are conserved during ETM, so that related groups of articles still share the same topical labels, etc. At the same time, a "topic-entity" probability matrix is iteratively generated in ETM in a similar or the same manner as the "topic-term" matrix was iteratively generated during TM analytics. This topic-entity probability matrix is the main result of ETM, and the probabilities therein describe the extent to which each entity is associated with each previously-discovered topic.

Table 1 below shows an example of the topic-entity probability matrix.

| Online Purchasing | | Brand Partnerships with Professional Baseball | | Holistic Approaches to Obesity Prevention and Overall Health | | Clean Water Initiatives | |
|---|---|---|---|---|---|---|---|
| Stakeholder | Probability | Stakeholder | Probability | Stakeholder | Probability | Stakeholder | Probability |
| Kraft | 0.0641 | Knorr | 0.0062 | Gandhi | 0.0292 | Nestle | 0.0779 |
| Nestle | 0.0367 | Wheaties | 0.0061 | Howard Papush | 0.0288 | Unilever | 0.0108 |
| Gerber | 0.0212 | Cracker Jack | 0.0049 | Johnny Carson | 0.0268 | Kellogg's | 0.0108 |
| Con Agra Foods | 0.0210 | Babe Ruth | 0.0045 | Howard | 0.0260 | Perrier | 0.0088 |
| Hershey Company | 0.0101 | Derek Jeter | 0.0039 | Richard Bach | 0.0259 | Hershey Company | 0.0065 |
| Jell-o | 0.0093 | Unilever | 0.0037 | Ken Cuccinelli | 0.0114 | Peter Brabeck | 0.0048 |
| H P Hood | 0.0085 | Davey Johnson | 0.0036 | Rick Santorum | 0.0112 | Water | 0.0047 |
| Unilever | 0.0073 | Frito Lay | 0.0035 | Wayne Dyer | 0.0104 | Dee | 0.0046 |
| Amazon | 0.0072 | Alex Rodriguez | 0.0029 | Wayne | 0.0070 | Dasani | 0.0045 |
| Philips | 0.0070 | Cal Ripken | 0.0028 | Albert Einstein | 0.0065 | Helen | 0.0044 |

Figure 5:
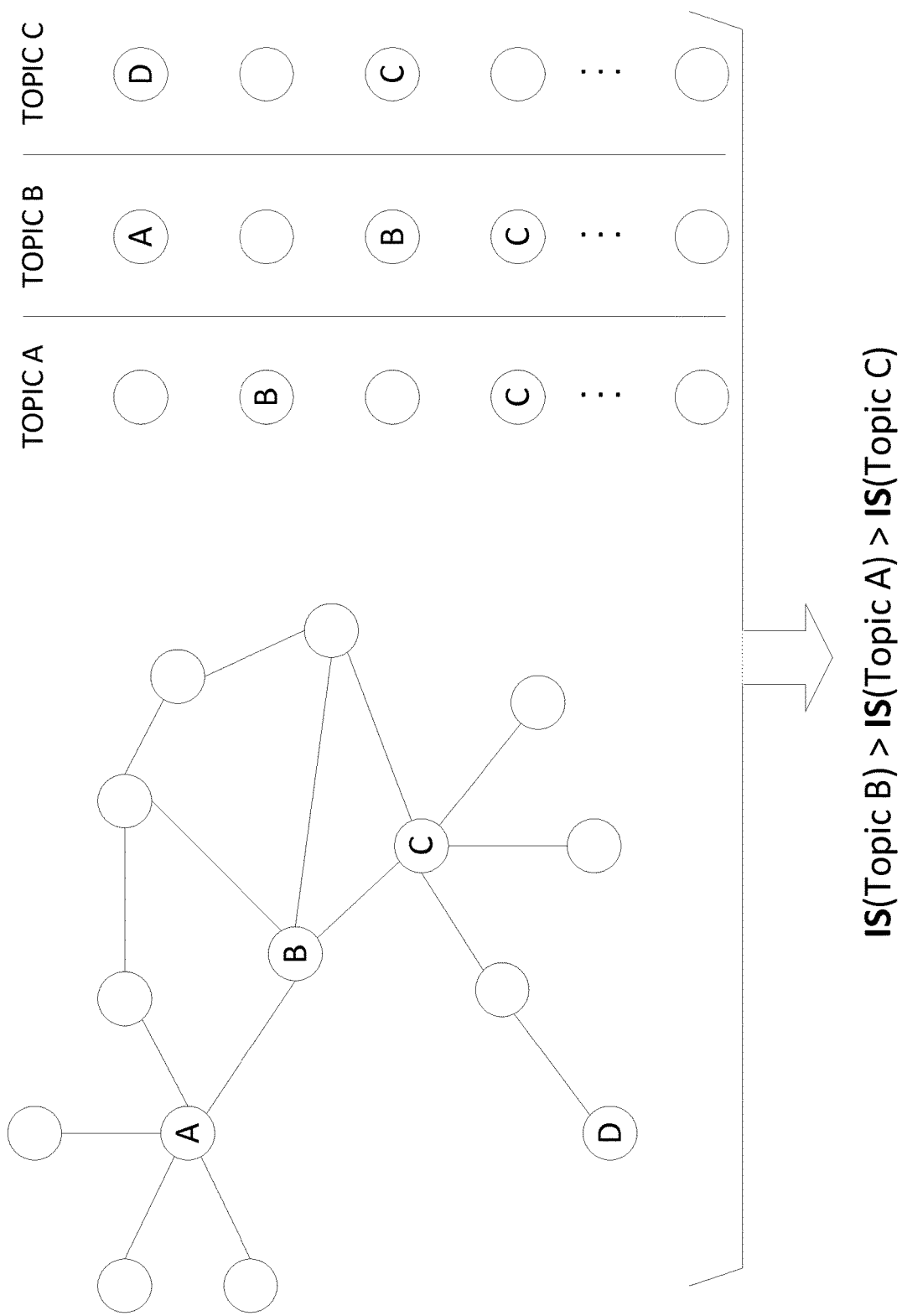
FIG. 5 is a diagram illustrating the logic of the influencer strength measurement.

FIG. 5 is a diagram illustrating the logic of the influencer strength measurement. On the left side of the figure is an example entity network. Each node in the network represents an entity extracted from the data, and each link stands for a co-occurrence relationship between two entities. The links can be weighted according to how many times the pair of connected entities is mentioned in the same document. Using closeness centrality, it can be learned that node a, b, c have relatively higher centrality than other nodes, and node d has the lowest centrality among all the nodes. On the right side of FIG. 5 is the output from an ETM. Under each topic, all entities are ranked based on the probability of the entity given the topic, or the association between the entity and the topic. Entities with higher rank are more closely related to the topic. In the given example of FIG. 5, it shows that the entities highly associated with Topic B are mostly highly centralized entities. On the other hand, the entities highly associated with Topic C have relatively low centralities. Therefore, considering both entities' global centrality and their associations with the topics, Topic B has the highest Influencer Strength and Topic C gets the lowest Influencer Strength.

Besides entity centrality and topic-entity association, another attribute of entities called Topic Frequency is also considered when calculating the final influencer strength. The Topic Frequency of an entity is the number of topics with which an entity is highly associated with. The purpose of using this factor is to emphasize topics associated with distinctive entities and diminish topics associated with common entities. For instance, if an entity has very high centrality, but turns to be highly associated with almost all the topics, then its importance in measuring topics' influencer strength is depreciated, because such entities help little in distinguishing important topics from average topics.

Overall, the influencer strength of a topic is calculated as follows:

$$IS(\text{Topic } A) = \sum_i \text{Centrality}(E_i) \times \text{Probability}(E_i \mid \text{Topic } A) \times \log\left(\frac{N_T}{TF(E_i)}\right) \quad \text{(Equation 2)}$$

Centrality ($E_i$) is the centrality of entity $E_i$ in the global entity network.

Probability($E_i$|$\text{Topic}_A$) is the probability of entity $E_i$ given $\text{Topic}_A$, which measures the topic-entity association $TF(E_i)$ is the Topic Frequency of entity $E_i$, the number of topics with which entity $E_i$ is highly associated.

$N_T$ is the number of total topics.

Speed 122

The speed subsystem 122 calculates speed analysis, also termed "velocity" due in part to the nature of its mathematical underpinnings, as a measure indicative of the up-to-date momentum behind a particular issue. The velocity metric calculated by the speed subsystem 122 is intended to at least partially answer questions about a velocity of an issue's development, such as, "How fast is this issue advancing?", and "How soon will this issue impact my industry?" As stated above, as the intensity of an issue increases, the time to react to the issue decreases. The velocity metric is an indicator of just how fast this "time to react" is diminishing.

In one form, the velocity metric is based upon the per-day volume of documents assigned to each issue by the speed subsystem 122. An issue's assigned documents are first binned according to the per-document sentiment scores, creating groups of positive (+), negative (−), and neutral-sentiment (≈) documents. In one form, neutral sentiment scores may range inclusively from 0.000000 to 0.148699. Initial calculations are performed both within each sentiment group, and also on the entire set of documents assigned to the issue.

For example, a cumulative sum vector, CSV of the daily volume, v, for each day, d, represented in the documents assigned to issue i is constructed for each binned sentiment group, t.

For each issue i, (this notation for issues, i, will be assumed throughout the rest of the section), for sentiment group t in +, −, ≈, and "all", $$CSV_{i,t}[d] = \sum_{j=1}^{d} v_{i,t}[j]. \quad \text{(Equation 3)}$$

A natural smoothing spline analysis (such as suggested by Ramsay et al., "Spline smoothing with model-based penalties," *Behavior Research Methods, Instruments, & Computers*, 29(1): 99-106 (1997)) may then be applied to each of the four cumulative sum vectors. For example, as noted below, the systems and methods described herein employ sm.spline( ) encoded in the "pspline" package in the R statistical programming language, using the default parameters.

For sentiment group t in +, −, ≈, and "all", smoothed vectors, $SM_{i,t}[d]$, are calculated as $$SM_{i,t}[d] = \text{sm·spline}(CSV_{i,t}[d]) \quad \text{(Equation 4)}$$

Smoothing is applied to add stability to the metric through minimizing or eliminating biases in the volume vectors that might be caused by extraneous variations not related to the intensity of the issue. For example, possible systematic differences between weekday versus weekend conversation volumes may cause variation which could be eliminated by a smoothing technique.

After smoothing, the first derivative of each smoothed vector, $SM'_{i,t}[d]$ is calculated at every point along the vector. After a second round of smoothing using the same spline function, the second derivatives of each vector, $SM''_{i,t}[d]$ are also tabulated.

For sentiment group t in +, −, ≈, and "all", for f[d] in $SM_{i,t}[d]$ and $SM'_{i,t}[d]$.

$$f'[d] = \frac{\Delta f[d]}{\Delta d} = \frac{f[d+k] - f[d]}{k}; \quad \text{(Equation 5)}$$

k typically = 1 day.

The values of the first derivatives in this analysis model the daily accumulation of volume with respect to the issue at hand, while the values of the second derivatives model the speed at which this accumulation is changing over time (i.e., the trends in per-day volume over time). If the first derivative is steady and constant, then the volume of conversation about the issue is also steady and constant, and the second derivative of the cumulative volume vector in this case would have a value of nearly zero. If the first derivative is steadily increasing, then the volume of conversation about the issue is also steadily increasing, and this situation would be denoted by a positive second derivative. The magnitude of the second derivative models the intensity level of the trend for both positive and negative second derivative values. Moreover, the values of the second derivatives near the most recent dates (d) along the daily volume vectors give an indication of the most recent trends in volume change.

These most recent second derivative values are used along with the mean and standard deviation of these values across all issues to heuristically assign a velocity metric score to each issue according to the following rules:

Velocity=1 if:

$$SM''_{i,aU}[\hat{d}] \leq (\mu(SM''_{aU}[\hat{d}]) - \sigma(SM''_{aU}[\hat{d}])) \text{ or } SM''_{i,aU}[\hat{d}] < 0.$$

In other words, if the trend in the overall volume of an issue is less than zero, or is at least one standard deviation lower than the mean daily volume change for all issues, then the particular issue is showing no significant increase in conversation, and receives a velocity score of 1 (slow-moving).

Else, Velocity=2 if:

$$SM''_{i,+}[\hat{d}] > SM''_{i,-}[\hat{d}] \text{ and } SM''_{i,+}[\hat{d}] > SM''_{i,\approx}[\hat{d}].$$

In other words, if the overall volume of an issue is trending upward, but the second derivative of the positive sentiment bin is higher than that of both the negative and neutral bins, then it is assumed that the overall trend in volume is upward in the positive direction, and so the issue is less urgent than negatively trending issues. In this instance, the velocity score assigned is 2 (slow to moderate speed).

Else, if:

$$SM''_{i,\approx}[\hat{d}] > SM''_{i,+}[\hat{d}] \text{ and } SM''_{i,\approx}[\hat{d}] > SM''_{i,-}[\hat{d}],$$

Velocity=3 unless:

$$SM''_{i,-}[\hat{d}] > 0 \text{ and } SM''_{i,+}[\hat{d}] < 0,$$

in which case, Velocity=4.

If the overall volume is trending upward with the neutral sentiment bin showing higher volume increases than both the positive and negative sentiment bins, then the issue is considered to have increases in conversation, but that this conversation is mostly neutral in sentiment. Opinions are considered to be still forming around issues such as these, and they therefore receive a velocity score of 3 (moderate speed).

When the neutral group of documents is increasing in volume more rapidly than any other group, but at the same time the number of positive documents about an issue is trending downward (decreasing day by day), then there is increased caution that the currently neutral conversation volume may also trend toward having negative sentiment. In this case, the velocity score assigned is 4 (moderate to fast speed).

Else, If:

$$SM''_{i,-}[\hat{d}] > SM''_{i,+}[\hat{d}] \text{ and } SM''_{i,-}[\hat{d}] > SM''_{i,\approx}[\hat{d}].$$

Velocity 4 if:

$$SM''_{i,all}[\hat{d}] \leq \mu(SM''_{all}[\hat{d}])(\text{less than average overall volume change});$$

Velocity 5 if:

$$SM''_{i,all}[\hat{d}] > \mu(SM''_{all}[\hat{d}])(\text{greater than average overall volume change})$$

Lastly, if the overall volume of an issue is trending upward and the largest proportion of that new volume is comprised of documents with negative overall sentiment, then this type of issue is the most critical. These issues receive a velocity score of 5 (fast-changing).

Reflection upon these scores gives context to their meaning. Issues assigned velocity scores of 1 exhibit either steady, slow-moving events, or do not have highly active or highly reactive ongoing conversation. Conversation about these issues may even be decreasing in volume. Issues assigned a velocity score of 3 are trending upward in terms of the amount of conversation, but most of this conversation is neutral in tone, indicating that opinions are still being formed around the issue, and there is still time to assert influence in the direction of choice. And lastly, if an issue is assigned a velocity score of 5, the metric is indicating that a significant increase in negatively-toned conversation regarding this issue has been observed. This indicates that the issue is highly volatile and that people are very unhappy about it. This also indicates that the time to react to this issue has almost completely vanished, as opinions around the issue have already been formed in a particular direction. This type of issue must be addressed as quickly as possible in order to establish a favorable position.

Emotion 124

The fourth component of the per-issue quantitative ranking score, R, is a measure of the overall emotional intensity (E) expressed in the group of articles making up each issue. E is calculated by the emotion subsystem 124. E is mathematically defined for each issue as the mean of all of the per-document emotion scores annotated during the data collection analysis for all of the articles assigned to the issue. Per-document emotion scores are based upon academic principles of risk communication and behavioral psychology. They offer a consistent, scientific technique for determining how persuasive a message about a given issue or entity is on an audience. The scores also provide an indication of how likely it is that an audience will react to a given situation. In other words, higher emotion scores indicate that an audience is more likely to react to a given issue, as they are assumed to be more emotionally invested. The overall emotional intensity, E, therefore, is a summary metric which describes the potential of a given issue to have a strong emotional effect on an audience.

In the systems and methods described herein, overall emotion is broken down into a plurality of separate emotional concepts, such as "dread", "uncertainty", "fairness", and so on. For each of the emotional concepts, a vector array of terms plus an associated weight for each term is defined, with the weight for each term describing the prevalence of the usage of the term when expressing the particular emotional concept. A similar term vector is also constructed for each document, consisting of the set of terms used to make up the document plus their frequency of usage within the document. Each of the emotional concept vectors is compared to a document's term-vector (e.g., via a Pearson correlation), creating correlation scores for each concept ranging between 0 and 1. These scores indicate the level of expression of each emotional concept within the given document. In one form, in order to arrive at the overall per-document emotion score, the correlation results for each emotional concept are weighted and summed. The scoring analytics defining the overall per-document emotion scores occurs during the data collection analysis, as described above.

FIG. 2

FIG. 2 is a block diagram illustrating a system hardware configuration for the system of FIG. 1 according to one example embodiment of the present disclosure. A computer system for identifying and prioritizing issues in electronic documents from electronic social media sources and/or from traditional media sources 104 is illustrated. The computer system includes a communication network 106 linked to one or more of the sources. A computer server 206 is in communication with the communication network. The computer server 206 is configured to receive electronic documents from the sources 104 via the communication network 106. The computer server 206 includes a memory 208 and a processor 210. The memory 208 stores processor executable instructions as noted herein which are executable by the processor. The server 206 is linked to an operator input device 204 and a display 212, both of which may be remote from the server 206 for use by the operator.

The processor executable instructions as noted herein include:

data collection instructions for retrieving and scoring documents from the sources via the network;

topic modeling instructions for identifying one or more issues in each of the retrieved documents according to terms in the retrieved documents including:

instructions for weighing each term in each of the retrieved documents with regard to its relevance to each identified issue; and instructions for indicating a distribution for identified issues within each of the retrieved documents;

issue assignment instructions for formally associating a limited list of specific issues with each retrieved document;

instructions for determining summary metrics for each identified issue; and instructions for ranking the issues relative to each other based on weighted summary metrics.

FIG. 4

FIG. 4 is a screen shot illustrating an example of an output display created in the system and method of FIG. 1 and presented on display 212. Each column noted in the display corresponds to the parameters noted above.

Further, the example methods disclosed herein may be implemented as computer-executable instructions. These computer-executable instructions may be stored on a non-transitory, tangible computer readable storage medium. In this way, the methods may be implemented in a computer program product stored on a computer readable medium. The computer readable medium may include for example, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

For example, the non-transitory computer readable medium may include instructions for generating statistical data from one or more training documents, creating at least one topic model-based classification rule using the statistical data, and creating at least one query-based classification rule using one or more user defined categories and the statistical data. The instructions stored on the non-transitory computer readable medium may then be employed in a system (e.g., the system 800) to classify an electronic document from an electronic media source.

The documents disclosed herein may include any suitable electronic document representing, for example, social media articles (e.g., a blog, a message, etc.), news articles (print or electronic), emails, etc. Additionally, the electronic media sources disclosed herein may include any suitable electronic media source including, for example, social media, news outlets, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:

a communication network;

a computing device in communication with the communication network, the computing device to receive electronic documents from electronic media sources via the communication network;

the computing device having memory and a processor, the memory having processor executable instructions stored in the memory that when executed by the processor cause the processor to perform operations comprising:

retrieving and scoring documents from the electronic media sources via the network by performing natural language processing on each document of the documents from the electronic media sources and storing full text and a single-valued score from each document in a database;

identifying at least one issue in each of the retrieved documents according to terms in the retrieved documents including:

weighing each term in each of the retrieved documents with respect to relevance of the term to each identified issue;

indicating a distribution for identified issues within each of the retrieved documents;

formally associating a list of specific issues with each retrieved document;

determining summary metrics for each identified issue by determining a Volume V and a Tone T for each issue based on the number of retrieved documents, and terms in the retrieved documents, respectively, determining an Influencer network strength I for each issue based on the entities identified within the retrieved documents, determining a Speed S for each issue based on a timing of the terms in the retrieved documents, and determining an Emotion E for each issue;

ranking the issues relative to each other based on weighted summary metrics; and displaying on a display, the issues ranked in order relative to each other based on the weighted summary metrics.

2. The system of claim 1, the operations further comprising:

identifying at least one initial issue in the collection of the retrieved documents according to terms in the retrieved documents; and identifying at least one issue in each of the at least one initial issue of the retrieved documents according to terms in the retrieved documents for each initial issue.

3. The system of claim 1, the operations further comprising determining a topic-term probability matrix and indicating the distribution for identified issues within each of the retrieved documents by determining a document-topic probability matrix.

4. The system of claim 3 the operations further comprising limiting the number of issues formally associated with each of the retrieved documents based on the values in the document-topic probability matrix.

5. The system of claim 1 the operations further comprising determining a weighted sum of the Volume V, the Tone T, the Influencer network strength I, the Speed S, and the Emotion E of each identified issue.

6. The system of claim 5 the operations further comprising:

determining a single quantitative ranking score, R, for each issue (i) according to the following:

$$R_i = \omega_V\left(\frac{V_i - \mu(V)}{\sigma(V)}\right) - \omega_T\left(\frac{T_i - \mu(T)}{\sigma(T)}\right) + \omega_I\left(\frac{I_i - \mu(I)}{\sigma(I)}\right) + \omega_S\left(\frac{S_i - \mu(S)}{\sigma(S)}\right) + \omega_E\left(\frac{E_i - \mu(E)}{\sigma(E)}\right) \quad \text{(Equation 1)}$$

wherein each summary metric is weighted using weights $\omega_V$, $\omega_T$, $\omega_S$, $\omega_E$ and $\omega_I$ for Volume, Tone, Influencer network strength, Speed, and Emotion, respectively, and wherein each summary metric is scaled by subtraction of a mean ($\mu$) across all of the issues and division by a standard deviation ($\sigma$) across all of the issues.

7. The system of claim 6 the operations further comprising selecting the weights $\omega_V$, $\omega_T$, $\omega_I$, $\omega_S$ and $\omega_E$ based upon an iterative process of evaluating historical quantitative scores calculated for previously-discovered issues, and comparing the scores for accuracy to the actual lifecycles of the described issues.

8. A non-transitory computer readable storage medium having instructions stored thereon that, when executed by at least one processor cause the at least one processor to perform operations, the operations comprising:

retrieving and scoring documents from electronic media sources via a communication network by performing natural language processing on each document of the documents from the electronic media sources and storing full text and a single-valued score from each document in a database;

identifying at least one issue in each of the retrieved documents according to terms in the retrieved documents including:

weighing each term in each of the retrieved documents with respect to relevance of the term to each identified issue;

indicating a distribution for identified issues within each of the retrieved documents;

formally associating a limited list of specific issues with each retrieved document;

determining summary metrics for each identified issue by determining a Volume V and a Tone T for each issue based on the number of retrieved documents, and terms in the retrieved documents, respectively, determining an Influencer network strength I for each issue based on the entities identified within the retrieved documents, determining a Speed S for each issue based on a timing of the terms in the retrieved documents, and determining an Emotion E for each issue;

ranking the issues relative to each other based on weighted summary metrics; and displaying on a display, the issues ranked in order relative to each other based on the weighted summary metrics.

9. The medium of claim 8 the operations further comprising:

identifying at least one initial issue in the collection of the retrieved documents according to terms in the retrieved documents; and identifying at least one issue in each of the at least one initial issue of the retrieved documents according to terms in the retrieved documents for each initial issue.

10. The medium of claim 8 the operations further comprising determining a topic-term probability matrix and indicating the distribution for identified issues within each of the retrieved documents comprises determining a document-topic probability matrix.

11. The medium of claim 10 the operations further comprising limiting the number of issues formally associated with each of the retrieved documents based on the values in the document-topic probability matrix.

12. The medium of claim 8 the operations further comprising determining a weighted sum of the Volume V, the Tone T, the Influencer network strength I, the Speed S, and the Emotion E of each identified issue.

13. The medium of claim 12 the operations further comprising determining the weighted sum by:

determining a single quantitative ranking score, R, for each issue (i) according to the following:

$$R_i = \omega_V\left(\frac{V_i - \mu(V)}{\sigma(V)}\right) - \omega_T\left(\frac{T_i - \mu(T)}{\sigma(T)}\right) + \omega_I\left(\frac{I_i - \mu(I)}{\sigma(I)}\right) + \omega_S\left(\frac{S_i - \mu(S)}{\sigma(S)}\right) + \omega_E\left(\frac{E_i - \mu(E)}{\sigma(E)}\right)$$ (Equation 1)

wherein each summary metric is weighted using weights $\omega_V$, $\omega_T$, $\omega_S$, $\omega_E$ and $\omega_I$ for Volume, Tone, Influencer network strength, Speed, and Emotion, respectively, and wherein each summary metric is scaled by subtraction of a mean (μ) across all of the issues and division by a standard deviation (σ) across all of the issues.

14. The medium of claim 13 the operations further comprising selecting the weights $\omega_V$, $\omega_T$, $\omega_I$, $\omega_S$ and $\omega_E$ based upon an iterative process of evaluating historical quantitative scores calculated for previously-discovered issues, and comparing the scores for accuracy to the actual lifecycles of the described issues.

15. A method comprising:
retrieving and scoring documents from electronic media sources via a communication network by performing natural language processing on each document of the documents from the electronic media sources and storing full text and a single-valued score from each document in a database;
identifying at least one issue in each of the retrieved documents according to terms in the retrieved documents including:
weighing each term in each of the retrieved documents with respect to a relevance of the term to each identified issue;
indicating a distribution for identified issues within each of the retrieved documents;
formally associating a limited list of specific issues with each retrieved document;
determining summary metrics for each identified issue comprising determining a Volume V and a Tone T for each issue based on the number of retrieved documents, and terms in the retrieved documents, respectively, determining an Influencer network strength I for each issue based on the entities identified within the retrieved documents, determining a Speed S for each issue based on a timing of the terms in the retrieved documents, and determining an Emotion E for each issue;
ranking the issues relative to each other based on weighted summary metrics; and
displaying on a display, the issues ranked in order relative to each other based on the weighted summary metrics.

16. The method of claim 15, further comprising:
identifying at least one initial issue in the collection of the retrieved documents according to terms in the retrieved documents; and
identifying at least one issue in each of the at least one initial issue of the retrieved documents according to terms in the retrieved documents for each initial issue.

17. The method of claim 15, further comprising determining a topic-term probability matrix, and indicating the distribution for identified issues within each of the retrieved documents comprises determining a document-topic probability matrix.

18. The method of claim 17, further comprising limiting the number of issues formally associated with each of the retrieved documents based on the values in the document-topic probability matrix.

19. The method of claim 15, further comprising determining a weighted sum of the Volume V, the Tone T, the Influencer network strength I, the Speed S, and the Emotion E of each identified issue.

20. The method of claim 19, further comprising determining the weighted sum by:
determining a single quantitative ranking score, R, for each issue (i) according to the following:

$$R_i = \omega_V\left(\frac{V_i - \mu(V)}{\sigma(V)}\right) - \omega_T\left(\frac{T_i - \mu(T)}{\sigma(T)}\right) + \omega_I\left(\frac{I_i - \mu(I)}{\sigma(I)}\right) + \omega_S\left(\frac{S_i - \mu(S)}{\sigma(S)}\right) + \omega_E\left(\frac{E_i - \mu(E)}{\sigma(E)}\right)$$ (Equation 1)

wherein each summary metric is weighted using weights $\omega_V$, $\omega_T$, $\omega_S$, $\omega_E$ and $\omega_I$ for Volume, Tone, Influencer network strength, Speed, and Emotion, respectively, and wherein each summary metric is scaled by subtraction of a mean (μ) across all of the issues and division by a standard deviation (σ) across all of the issues.

21. The method of claim 20 further comprising selecting the weights $\omega_V$, $\omega_T$, $\omega_I$, $\omega_S$ and $\omega_E$ based upon an iterative process of evaluating historical quantitative scores calculated for previously-discovered issues, and comparing the scores for accuracy to the actual lifecycles of the described issues.

\* \* \* \* \*